United States Patent [19]

Rossin

[11] Patent Number: 4,468,658
[45] Date of Patent: Aug. 28, 1984

[54] SIMPLIFIED INTRUDER DETECTION MODULE

[76] Inventor: John A. Rossin, 1411 Norman Firestone Rd., Goleta, Calif. 93017

[21] Appl. No.: 215,800

[22] Filed: Dec. 12, 1980

Related U.S. Application Data

[63] Continuation-in-part of Ser. No. 192,067, Sep. 29, 1980, , and Ser. No. 117,957, Feb. 4, 1980, , and Ser. No. 73,869, Sep. 10, 1979.

[51] Int. Cl.³ ............................................ G08B 13/18
[52] U.S. Cl. .................................. 340/567; 250/340; 250/353; 340/565
[58] Field of Search .............. 340/565, 567, 555, 556; 250/340, 342, 353; 338/18

[56] References Cited

U.S. PATENT DOCUMENTS

| | | | |
|---|---|---|---|
| 3,524,180 | 8/1970 | Cruse | 340/567 X |
| 3,551,676 | 12/1970 | Runnels | 250/353 |
| 3,631,434 | 12/1971 | Schwartz | 340/567 |
| 3,751,664 | 8/1973 | Falbel | 250/353 |
| 3,760,399 | 9/1973 | Schwarz | 340/567 |
| 3,829,693 | 8/1974 | Schwarz | 250/342 X |
| 3,839,640 | 10/1974 | Rossin | 250/353 |
| 3,923,382 | 12/1975 | Harding | 250/353 X |
| 3,928,849 | 12/1975 | Schwarz | 340/567 X |
| 3,958,118 | 5/1976 | Schwarz | 340/567 X |
| 4,052,716 | 10/1977 | Mortensen | 340/567 X |
| 4,179,691 | 12/1979 | Keller | 340/567 |

*Primary Examiner*—Glen R. Swann, III
*Attorney, Agent, or Firm*—Spensley Horn Jubas & Lubitz

[57] ABSTRACT

An Improved Intruder Detection Module is disclosed that incorporates a compact, unique optical system, a detector array, and an electronic system of a combined size and configuration that permits the Module to be shaped to approximate a normal household wall outlet box and its associated face panel. The optical system incorporates removable facet reflectors enabling the system to monitor any of a variety of different fields of view. The detector array includes pyroelectric elements mounted in an adjacent facing relationship to cause radiation passing through one element to immediately pass through the adjacent element, thereby causing intense white light to which the detector elements are not particularly responsive to generate substantially the same electrical signal in both elements. The electronic system may include a unique self-checking feature to regularly insure that the system is properly functioning, thereby avoiding nonresponse to an intruder. The electronic system also may dynamically adjusts its effective sensitivity to insure proper response of the system to low level inputs.

21 Claims, 9 Drawing Figures

SIMPLIFIED INTRUDER DETECTION MODULE

CROSS-REFERENCE TO RELATED APPLICATIONS

This application is a continuation-in-part of applicant's co-pending applications Ser. No. 192,067 filed Sept. 29, 1980 and Ser. No. 73,869 filed Sept. 10, 1979, both entitled Improved Intruder Detection System, and also is a continuation-in-part of applicant's copending application Ser. No. 117,957 filed Feb. 4, 1980, entitled Intruder Detection System.

BACKGROUND OF THE INVENTION

1. Field of the Invention

The invention concerns an intruder detection module, particularly one adapted to be mounted in the wall of a home or business, the module incorporating an improved and simplified system for detecting and signalling the presence of an intruder within the areas viewed by the system.

2. Prior Art

Numerous systems have been designed and are presently in use to sense and signal the presence of an intruder within a defined area.

Some intrusion detection systems are active in nature, producing a signal within or confined to a secure area, the signal being effected by the presence of an intruder and this effect being employed to actuate an alarm or other signal. Not only do such active systems require a continuous energy input, but they are prone to take alarms and their presence can be detected by the intruder, all of which cause the system to be ignored, avoided or otherwise negated.

Some intrusion detection systems are of a passive nature. Most passive systems detect the presence of an intruder in a defined area by sensing and responding to visible or non-invisible radiation of the intruder. Rossin U.S. Pat. No. 3,839,640, dated Oct. 1, 1974, presents an example of an intruder detection system responsive to infrared radiation, a system that is remarkably free from fake alarms.

Intrusion detection systems are subjected to a number of non-intruder related inputs, all of which must be distinguished from an intruder related input if the system is to prove practical in use. Inputs which can cause passive infrared systems to prodduce false alarms include reflected sunlight from an airplane or automobile, or lights being directed onto the detector from automobile headlights, or a flashlight out of the detection area. An intermittent electric heater, or a flickering light bulb in the detector's field of view, also can actuate present systems, causing a false alarm.

An intrusion detection system must avoid false alarms, particularly from such environmental occurrences. Certain communities, for example, levy a fine of hundreds of dollars for each false alarm to which its police force must respond. While achieving an intruder detection system that avoids such false alarms is therefore quite important, it is of course equally important to detect the presence of an intruder, even when the intruder is taking steps to avoid detection, such as by wearing white clothing while crossing a white background or while crossing a monitored background only after having somehow adjusted his external temperature to closely approximate that of the background temperature. In short, detecting the presence of an intruder while not producing numerous false alarms presents a significant problem, one which has only been partially solved by previous intruder detection systems.

It is also important to provide an intruder detection system of reasonable size, preferably one which requires no external power source and is small enough to mount in a reasonably inconspicuous fashion at any of various locations throughout a building. For example, a system that could be incorporated in a module that can be mounted in a wall, and that approximates in shape and style an ordinary wall switch or outlet face plate, would be quite desirable because it would be relatively inconspicuous in appearance.

Among other desirable features of an intruder detection system are features to automatically detect a malfunction of the system. As has been noted, it is as important to detect an intruder as to avoid false alarms from extraneous environmental occurrences. The system must be in a proper operative condition if it is to achieve these results. Accordingly, a system which incorporates certain self-checking and self-testing features would be highly desirable.

OBJECTIVES

An object of the present invention is to provide an intruder detection module and system designed and adapted to avoid producing an alarm signal and response to non-intruder related inputs, but to produce an alarm signal only in response to the presence of an intruder within a monitored area. Another object is to provide such a system within a module of a size and shape that can be mounted inconspicuously on the wall of a monitored area, preferably as a module that includes a front panel of a size and shape which approximates an ordinary wall switch or outlet face plate. A further object of the invention is to include in the system self-checking and self-testing features to regularly assure the user that the system is operating properly. These and other objects will be apparent to those skilled in this field from the following detailed description of a preferred embodiment of the invention.

BRIEF SUMMARY OF THE INVENTION

The preferred Intruder Detection Module of the invention incorporates sensor means for producing an electrical signal in response to non-visible radiation emitted by an intruder, the sensor means having at least one pair of sensor elements, each sensor element of which preferably is substantially opaque to non-visible radiation but substantially transparent to visible radiation. The Module includes optical means that direct both visible and non-visible radiation from a plurality of zones onto the sensor means, the radiation from one zone being directed onto one sensor element of the sensor pair, the radiation from a second zone being directed onto the second sensor of the sensor pair. Means are also provided to direct radiation passing through one sensor of the pair to the other sensor of the pair. Electronic means are included in the Module, the means being responsive to the electrical signal outputs of the sensor pair to produce an alarm signal if one then the other of the sensors produces an output, but to inhibit an alarm signal if both sensors produce an output at substantially the same time. Such a Module and system has been found to discriminate quite well between visible light flashes and movement of a non-visible radiation source across the zones defined by the optical means to produce an alarm signal only in response to such non-visible radiation source movement.

Preferably the optical means of the Module includes a primary reflector. It may also have at least one facet reflector to direct radiation from other zones onto the primary reflector. Radiation is directed from the primary reflector to the sensor means, thereby enabling each sensor of the sensor pair to view a multiplicity of zones, at least one of which is defined by the facet reflector. Also, preferably the sensor elements are mounted in a parallel, back-to-back relationship so that radiation passing through one sensor immediately impinges upon the other sensor. Further, in the preferred construction the Module is compactly designed and shaped to provide a face plate approximating in size and shape the face plate of an ordinary household wall light switch or electrical outlet.

In a preferred construction, the electronic means of the Module includes means connected to the sensor elements and responsive to the electrical signals they generate to produce an alarm signal, this means having two channel means, each channel means being connected to a corresponding one of the pair of sensor elements to produce a first output signal when the output of the sensor element reaches a given level indicative of the presence of an intruder. Alarm actuation means are connected to be electrically responsive to the first output signals of the two channel means to generate an alarm signal. Means are also included to respond to the substantially simultaneous generation of first output signals to inhibit the generation of an alarm signal, thereby detecting environmentally related or extraneous inputs to the system and preventing false alarms. This system may also include signal means responsive to the first output signals to produce a signal effectively increasing the sensitivity of the sensors, thereby to ensure that low level inputs to the sensors are sufficient to cause, when one channel means produces a first output signal, the other channel effectively to be more sensitive to radiation. This increased sensitivity ensures that low level simultaneous inputs will be detected.

Among the important features of the electronic means of the Module is the inclusion of a test circuit responsive to either of the first output signals to cause the alarm actuation means to generate an alarm signal if either of the channel means, or if the inhibition means, is not operating properly. This may be is achieved by feeding to both channel means a simultaneous input which will result in no alarm signal unless either of the channel means or the inhibition means is malfunctioning, in which event an alarm signal will result. Timing means also are included in the electronic means to define an initial period during which substantially simultaneous inputs to the channel means will be cancelled, then a subsequent period (the normal period for an intruder to cross the fields of view), this period resulting in an alarm signal if a second output signal occurs within it. A third period also may be provided during which the test circuit functions to ensure that the electronic means are properly operating. Accordingly, each time an event is detected, the electronic means will recheck itself to make sure that it is operating properly.

While the preferred embodiment of the Intruder Detection Module incorporates a variety of important and unique features, of course variations in the preferred Module, and changes in the various systems included in that Module, will be apparent to those skilled in this art from the teachings set forth herein.

BRIEF DESCRIPTION OF THE DRAWINGS

The invention will be further described in connection with the accompanying drawings, in which.

DETAILED DESCRIPTION

As has been stated, because of various features of the Module and its subsystems, the Intruder Detection Module described herein is uniquely capable of sensing and detecting the presence of an intruder in a monitored area while avoiding false alarms from other inputs. Also, it is relatively small in size, and quite inconspicuous when properly mounted to monitor an area. In part, these features are attained by a unique and versatile optical system and its interrelationship with the detector array; in part these advantages are achieved by certain features of the electronic system; in part it is achieved by the synergistic cooperation of these systems and the detector array.

While these components and advantages will be described subsequently, it is the teachings presented herein to those skilled in this field, not the specific embodiments, that are inventive. Others may use such teachings in different environments to achieve similar or identical results. Also, others may add other features to the Module herein described, or vary certain of the constructions herein set forth to suit their design preferences, or for other reasons. Accordingly, while certain preferred embodiments of the invention are described, and while certain variations or modifications in the design and construction of these embodiments also are described, since other variations likely will occur to those skilled in this field, the invention should not be thought of as limited in any way to such specific embodiments.

Figure 1:
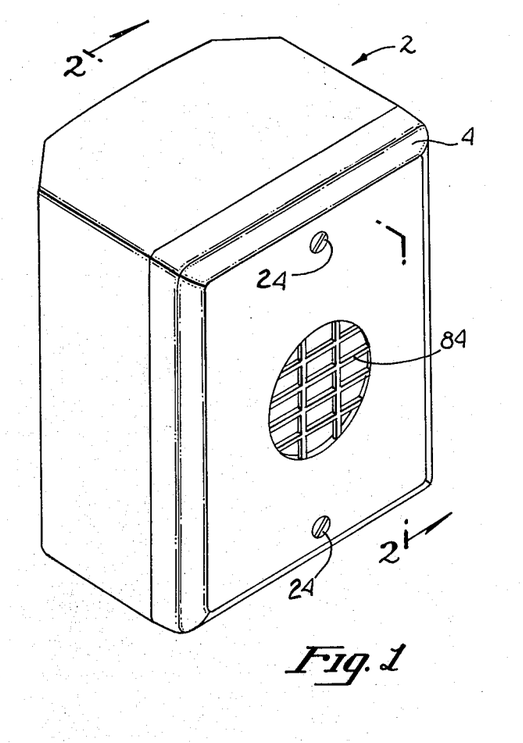
FIG. 1 is a perspective view of the Intruder Detection Module.
Figure 2:
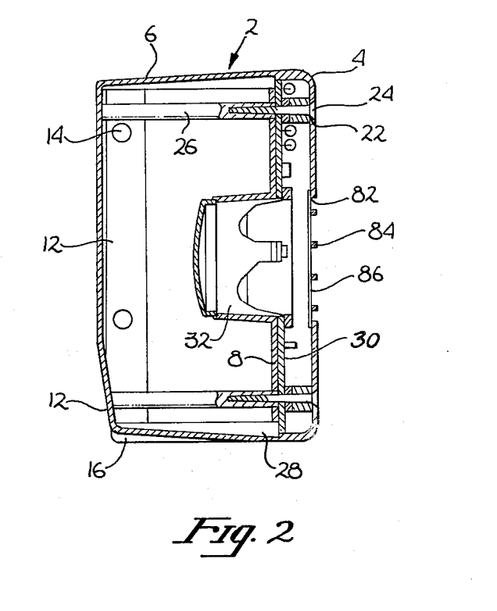
FIG. 2 is a view and vertical cross-section of the Module taken on lines II—II of FIG. 1.

The Intruder Detection Module is shown in perspective view in FIG. 1, and in a vertical cross-sectional view in FIG. 2, this view being taken on lines II—II of FIG. 1. As FIG. 1 well illustrates, the external appearance of the Module is quite similar to the external appearance of a wall outlet box and face plate. Because of the unique optical design, electronic system packaging, and other features of the Module, in overall dimensions it can closely approximate the dimensions of a wall outlet box and face plate. For example, the Module has been constructed to provide a face plate of approximately 3.5 inches in width by 4.5 inches in height, the depth from the front of the face plate to the back of the Module being approximately 2.4 inches with the wall outlet box back casing (or about 1.8 inches deep if used without the back casing).

As best shown in FIG. 2, preferably the Module 2 includes a face plate 4 received in a casing 6, there being a back plate 8 positioned between the face plate and the casing. Preferably sufficient space is provided between the casing and the back plate to receive auxiliary equipment such as a radio transmitter or hard-wired alarm circuit connection to the system within the Module.

In the preferred embodiment, the casing 6 is shaped to provide a number of planes or surfaces 12, these surfaces including various recesses 14, sometimes called flashed holes. Thus, when desired the casing of the Module can be screwed to a wall or other surface by punching out appropriate recesses 14 to provide screw openings, the faces 12 bearing flat against the surface when the screws in recesses 14 are tightened down.

The planes or surfaces 12 provided on casing 6 are such that the Module can be installed at one of various horizontal angles preset by these planes, angles such as 10 degrees, 45 degrees and 85 degrees as well as various preset vertical angle adjustments to provide a level or horizontal view as well as a downward tilt of 5 degrees or 10 degrees from the horizontal, assuming the casing to be attached to a vertical surface such as a wall. Preferably at least two of the faces 12 are vertical faces on the back corners of the casing, these faces being at 90 degrees to one another and at 45 degrees to the sides and rear wall of the casing, thereby permitting the casing to be mounted in the corner between two abutting walls of a room. Also, preferably the casing includes two base ridges 16, the bottom surfaces of which lie at approximately 90 degrees to the front and back faces of the Module permitting the Module to be positioned upright on these ridges, the ridges resting on a horizontal surface such as a table or the underside of a desk. Of course, a preferred mounting of the module is within a wall, the face plate projecting slightly beyond the plane of the wall to simulate a normal electrical wall outlet face plate or switch face plate.

Face plate 4 includes two openings 22, each opening receiving a screw 24 that threads into a column 26 projecting towards the face plate from the back surface of the casing. Openings 22 are spaced in the standard separation of openings in a typical wall face plate, thereby permitting screws 24 to attach the face plate 4, back plate 8 and the structure between these two plates to a typical electrical wall outlet box if desired (or simply to be screwed into a wall if no outlet box is conveniently located. Also, preferably face plate 4 includes a recess portion about its rim to receive the outer edges of the back plate, the back surface of the back plate and the rear edge of the face plate thereby lying in the same plane, the two plates forming a compact unit. The back plate may include recesses to receive lugs 28 in the casing, thereby to positively position and orient the face plate and back plate relative to the casing independent of screws 24. Between the face plate and the back plate is received a printed circuit board bearing the Module's electronic system.

Figure 3:
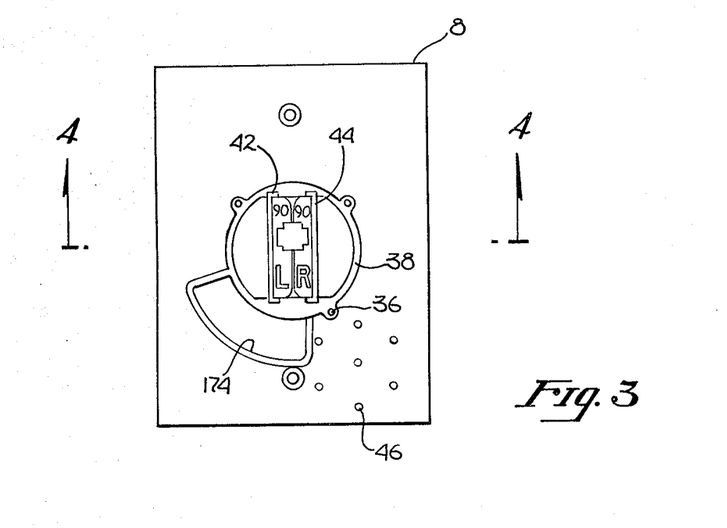
FIG. 3 is a front view of the back plate and associated optical system of the Module.

The front surface of the back plate 8 is shown in FIG. 3. To better illustrate the optical system, this system is shown in an enlarged cross-section in FIG. 4 taken on lines IV—IV of FIG. 3. The optical system includes a conical barrel 32 projecting outwardly from the back plate and receiving, in its outer end, a cap 34. The inner surface of this cap is shaped (preferably aspherically to correct the optical system), and is coated to constitute the primary spherical, concave reflector of the optical system. Mounted on pins 36 upstanding from the back plate is a generally circular ring 38. Opposed portions of the rim of this ring are enlarged and include recesses 42 which receive the outer rims of opposed deflector plates, or facet reflectors, 44. These facet reflectors are reflective on their outwardly facing surfaces, and are removable, permitting them to be eliminated if desired or replaced with other facet reflectors to achieve results which will hereinafter be described. The spacing of cap 34 relative to the other optical elements determines the effective aperture of the optical system.

Figure 4:
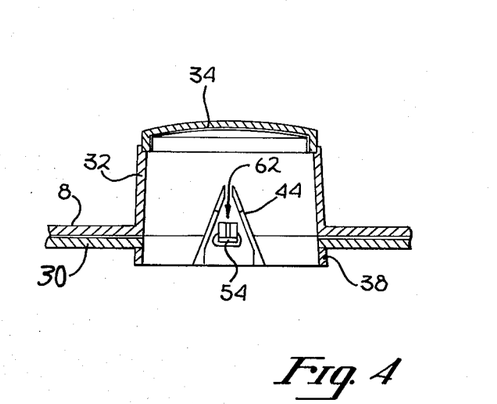
FIG. 4 is an enlarged view in horizontal cross-section taken on lines IV—IV of FIG. 3, showing a portion of the back plate to better illustrate the optical structure of the Module.
Figure 5:
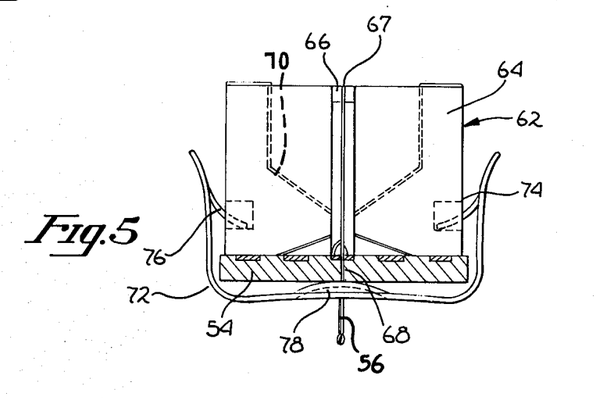
FIG. 5 is an enlarged cross-sectional view of the preferred detector array and the associated printed circuit board tab.

The printed circuit board 30 bearing the electronic system is mounted, as shown in FIG. 4, between ring 38 and back plate 8. The board preferably includes openings to receive pins 46, the pins locating and corralling a battery held on the printed circuit board by spring contacts or connectors. The board also includes a large opening that approximates in shape and size the inner opening of ring 38. The board further incorporates a tab portion 54 that extends into the space defined by the inner opening of ring 38. On this tab 54 at the center of ring 38, which is also the geometrical axis of the system, is mounted a detector array 62, one edge of the array preferably being at the center of the system to provide the desired view pattern. This detector array is best illustrated in FIG. 5, where it is shown in an enlarged vertical cross-section.

The detector array 62 consists of two identical secondary reflectors 64 mounted in an opposed relationship, as shown, and two detector element frames 66 which are also mounted in an opposed relationship. Preferably each detector frame is formed of an insulating material, such as from a sheet of plasticized polyvinyl chloride, and has attached to its outer face by an adhesive such as an ultraviolet cured optical adhesive made by Norland, or any other appropriate means a piece of pyroelectric material such as polyvinylidine flouride (PVF2). Many other pyroelectric materials are also suitable, such as the many transparent ceramic pyroelectrics, or triglycine sulfate (TGS). The outer surface of this material (the surface facing away from the adjacent frame) is coated with an appropriate material, such as indium tin dioxide, to be both transparent and electrically conductive in one or more defined areas, or over its entire surface. The inner surface of this material, and the inner surface of the frame (the surfaces facing towards the adjacent frame) are also coated with a conductive material, such as indium tin dioxide, either over certain defined areas or over its entire surface, to provide one or more electrodes opposed to the electrode provided on the outer face of the material. In addition, a piece 67 of material such as unplasticized polyvinyl chloride, a material that is transparent to visible radiation but is relatively opaque to infrared radiation, may be included between the frames for very high sensitivity long range models to prevent any long wavelength infrared radiation (e.g. 10 microns) passing from one pyroelectric element to the other. Thus, white light and short wavelength infrared radiation will effect both elements substantially equally, but long wavelength infrared radiation coming from one field of view (such as an intruder) will only effect one of the elements.

After being so fabricated, these frames and the secondary reflectors may be held together by one or more springs, as subsequently described, or they may be bonded together such as by an appropriate adhesive. In any event, a wire 68 projects from between the frames, this wire preferably passing through an opening in the printed circuit board and being attached to a common return line. For example, to achieve this the wire may be attached to a clip, and then in turn electrically connected to printed circuit tab 54 to electrically attach the inner electrodes of the detector elements to the electronic system included in the Module. The outer conductive coatings on the pyroelectric pieces provided on the outer surfaces of the detector array are similarly connected to conductive strips provided on the printed circuit tab, preferably through an electrically conductive and reflective coating on secondary reflectors 64, and thereby to the Module's electronic system.

As has been stated, the dector element is received between two secondary reflectors 64. Each of these reflectors includes an inner surface 70 at substantially 45 degrees to the plane defined by the faces of the detector frame. Of course, other configurations may be employed for inner surface 70; they may have a parabolic shape, for example. The inner surfaces, and the channel within the secondary reflector terminating in these surfaces, preferably are coated with a reflective material, such as gold, to direct radiation entering the detector array onto detector elements positioned on the frames. A spring or other element 72 surrounds the secondary reflectors and frames to clamp and hold them together as a unit. Recesses 74 provided within the secondary reflectors 64 receive the ends 76 of the spring. The spring is shaped to not only hold the array together but also to clip the detector array to the printed circuit tab. The center portion of the spring may be shaped to provide a raised dimple 78 to assist in holding the array to the printed circuit tab, and also to prevent the spring from being overbent and flattened if it should be depressed, such as when the printed circuit with the detector array is placed on a surface and rests upon spring 72.

Face plate 4 of the Module includes a central opening 82 generally overlying ring 38 of the back plate, this opening including a grid 84. The members along one axis of this grid preferably overly the edges of facet reflectors 44 received in ring 38 to minimize their interference with the optical system. Behind grid 84, and on the inner surface of face plate 4, is mounted a sheet 86 of material that is substantially opaque to visible light but transparent to non-visible radiation, particularly infrared radiation, such as a sheet of white polyethylene.

Both visible and non-visible radiation passing through opening 82 and sheet 86 may thereafter pass through the opening in ring 38 and along barrel 32 to be reflected from the primary spherical reflector 34. Certain rays of that radiation will then pass to the detector array, striking the inner reflective surface of secondary reflector 64 and passing through the pyroelectric material mounted on the adjacent detector frame. Since this material is substantially opaque to non-visible radiation, such as the detected infrared radiation, most of the infrared radiation will be absorbed by the material and generate a corresponding electric potential in the material. This potential is sensed by the electrical system through its contacts 56 to the material as an electrical signal. Because of the absorption of infrared energy in the material, only a very small portion of the radiation will pass from the first frame to the second frame. In this fashion, the detector elements on the two frames view one or more discrete areas defined by the optical system and separately respond to non-visible radiation in those fields of view.

Some visible radiation and all short wavelength infrared radiation (e.g. less than 3 microns) will pass through the opaque sheet 86, particularly if a strong source of visible light (such as reflected sunlight) is directed onto the Module face. This visible light will pass along the optical system to be reflected by the primary reflector 34 and by secondary reflectors 64 to strike the adjacent detector element. Since that detector element is substantially transparent (at least in the preferred embodiment) to such visible radiation, and since there is no significantly reflective secondary surface between the frames, and since the frames are so close together, the visible radiation will pass through the pyroelectric material on one frame after one or more reflections and then through the material mounted on the adjacent detector frame to be reflected from the other secondary reflector 64 and to generally retrace its path back out of the Module along the optical system. While this visible radiation may produce, in at least some pyroelectric materials, a measurable electrical signal, since substantially the same electrical signal will be simultaneously produced in both detector elements the two signals are easily cancelled electrically. If the light flash includes non-visible radiation components, since these components will strike both detector elements substantially simultaneously, and be substantially equal in intensity, they too are easily cancelled out by the associated electronic system. Trying to achieve this result with filters, such as of germanium, or with selectively reflective coatings on the first surfaces of the pyroelectric pieces, is virtually impossible.

Figure 6:
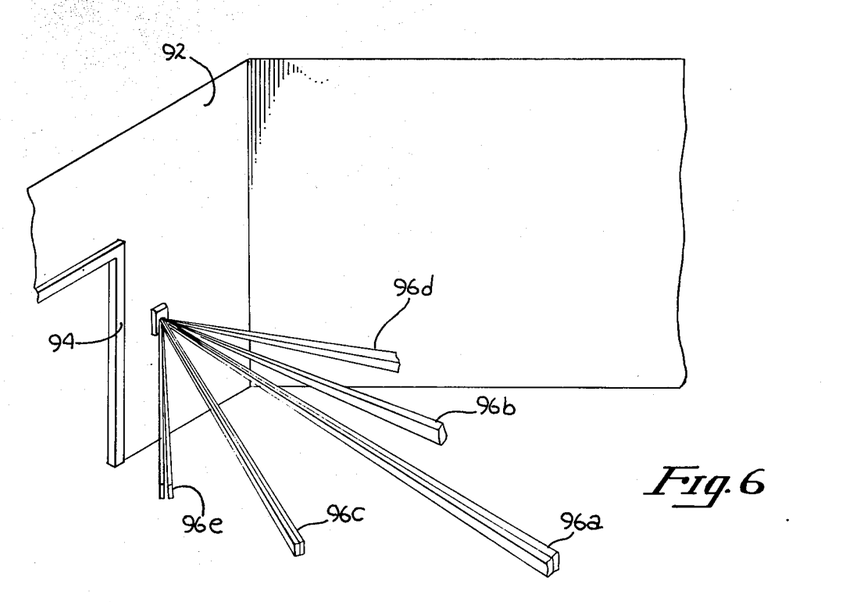
FIG. 6 is a perspective view of a portion of a room showing the Module mounted in a wall and illustrating various viewing areas that can be monitored by the preferred viewing system incorporated in the Module.

As has been noted, preferably the facet reflectors 44 are removable. By selecting or eliminating various facet reflectors, upon or after installation the user can program the module to direct the desired field or fields of view onto the detector array. For example, in FIG. 6 is shown the Intruder Detector Module mounted on a wall 92 adjacent a doorway 94. In the preferred construction, at least five different fields of view are possible; fields of view 96a, 96b, 96c, 96d, and 96e. Each field of view includes two adjacent but discrete zones. Preferably fields of view 96d and 96e are at approximately 90 degrees to one another, while fields of view 96b and 96c are at approximately 45 degrees to one another. Also, preferably each field of view spans approximately 4 to 5 feet at a distance of 25 feet from the Module. Further, preferably one of the generally horizontal planes defining the field of view is at right angles to the Module, while the other diverges at an angle from the Module to provide a field of view approximately 3 feet deep at a distance of 25 feet from the Module. This is achieved at least in part by offsetting the detector array slightly, from the axis of the optical system, as shown and described. Thus, in one orientation if the Module is mounted five feet above the floor to simulate a wall switch (as shown in FIG. 6), the field of view at 25 feet will extend from a distance of approximately two feet above the floor to a distance of approximately five feet above the floor. If the Module however is mounted one to two feet above the floor, to approximate in appearance an electrical outlet, by turning the face plate and back plate upside down the field of view can be made to extend from approximately two feet above the floor to approximately five feet above the floor at a distance of 25 feet from the Module. In other words, one side of the field of view extends generally parallel to the floor, whereas the other side of the field of view diverges to approach the floor in one orientation, or to recede from the floor in another orientation.

If both facet reflectors 44 are removed from the Module, the Module will view the field generally designated as 96a. When so arranged, the Intruder Detection Module and the electronic system it incorporates is effective to monitor events occurring in its field of view for a distance of approximately 50 feet or more. By adding two facet reflectors 44 to the Module, the Module may be made to view fields of view 96b and 96c as well as 96a, or 96d and 96e as well as 96a, depending upon the angular orientation of the facet reflectors 44. Of course, if only one facet reflector 44 is included, the system may be made to monitor field 96a and any one of the other fields, or if desired by adding two different facet reflectors 44 the system may be caused to view fields 96a, b and e, or 96a, c and d. In short, this construction of the optical system provides an important capability to the system, permitting it to be user programmed to view any of various field arrangements suitable to effectively monitor the desired area.

Figure 7:
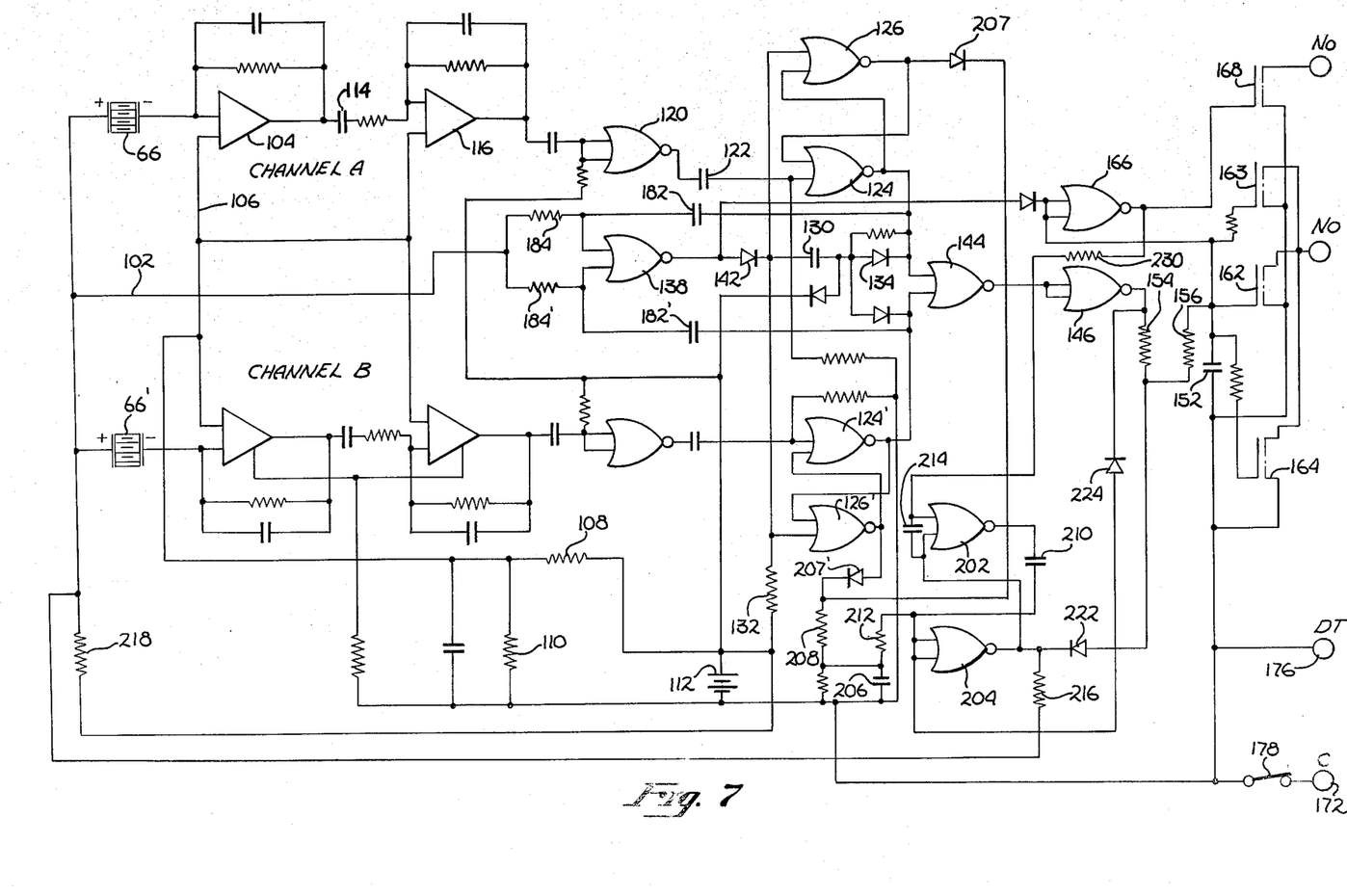
FIG. 7 is schematic diagram of a preferred electronic system incorporated in the Module.

One preferred electrical system is schematically illustrated in FIG. 7. It includes two channels, which for convenience will be referred to as Channels A and B, each channel amplifying and processing the electrical signal provided by the pyroelectric material on one of the two frames. More specifically, the pyroelectric material 66 attached to one of the frames is connected to provide the input to Channel A while the pyroelectric material 66' on the other frame is connected to provide the input to Channel B. The electronics for Channels A and B operate in much the same fashion. For that reason, only the operation of Channel A will be summarized. Of course, the connection provided by pin 68, the common connection between the two pyroelectric detectors, is the connection to common line 102 shown in FIG. 7.

The signal appearing on the pyroelectric detector 66, whether from an intruder or from an extraneous input, is applied to operational amplifier 104. The other input to that operational amplifier, the input applied by line 106, is from a voltage dividing resistive network 108–110, the input voltage to which is supplied by the positive side of a 3 volt battery 112. The output of operational amplifier 104 is applied thorough capacitor 114, to isolate the next operational amplifier from DC, or quiescent, signals. A second operational amplifier 116 also is biased by the voltage appearing on line 106 through the illustrated connections. Its output is applied to a Nor gate 120. In the quiescent state, this Nor gate produces as an output a logic 0 (ground) signal. The negative going input to Channel A provided by detector 66, if above some minimum noise level, causes the operational amplifiers to apply a signal to Nor gate 120 which in turn causes its output to go from a logic 0 condition to a logic 1 condition (e.g., 3V positive). This output is coupled by capacitor 122 to a Nor gate latch circuit consisting of Nor gates 124 and 126, the output from Nor gate 120 being applied to one of the inputs of Nor gate 124.

In the static or quiescent state, battery 112 charges capacitor 130 through resistor 132, the rate of charge of the capacitor being determined by the resistor, the resistor being selected to charge capacitor 130 at a rate sufficient to trip Nor gate 126 a few seconds (e.g., 8–10 seconds) after capacitor 130 has been discharged. Since in a quiescent state the system has been on for at least this length of time, latch circuit Nor gates 124 and 126 are biased by capacitor 130 to a condition in which Nor gate 124 produces a logic 1 output. Thus, when a signal occurs which causes Nor gate 120 to go to a logic 1 condition, this in turn causes Nor gates 124 and 126 to change state, Nor gate 124 going from a logic 1 to a logic 0 condition. This rapidly discharges capacitor 130 through diode 134. Also, this causes Nor gates 124 and 126 to latch in this changed condition, Nor gate 124 providing a logic 0 output, until capacitor 130 recharges either through resistor 132 at a relatively slow rate, or by virtue of an output provided by logic circuit 138 through diode 142 as a result of occurrences which will be described shortly.

Assuming that an intruder is passing through the fields of view of the Module, shortly after detector 66 triggers the A channel to cause Nor gate 124 to produce a logic 0 output, the same sequence will occur in channel B causing its Nor gate 124' to also produce a logic 0 output. These outputs in turn are applied to Nor gate 144, to cause the output of Nor gate 144 to change to a logic 1 state. This logic 1 state is applied to both inputs of Nor gate 146, causing its output to go to a logic 0 condition. This in turn causes capacitor 152, which in the quiescent state of the system had been charged to a logic 1 condition, to discharge through resistors 154 and 156, the discharge rate being determined by these resistors. Since the connected elements of the system may have appreciable capacitance, capicitor 152 may be eliminated if desired.

The discharge of capacitor 152 turns off VMOS power FETs 162, 163 and 164. Simultaneously it causes the output of Nor gate 166 to go to a logic 1 condition, turning on VMOS power FET 168. This change in the states of the VMOS power FETs 162, 163, 164 and 168 provides an alarm condition or signal to associated equipment, such as a radio transmitter or an alarm system, attached to the Module between the outputs of these FETs and a common or ground terminal 172. The wiring for these attachments may be provided by leads through a window 174 in back plate 8, this window being shown in FIG. 3. Preferably the attachments to these VMOS FETs are provided by pads on the printed circuit board 52, the pads being exposed through window 174 to permit such connections to be made without separating the back plate from the face plate of the Module. Another terminal is also exposed to connection through window 174, this terminal being terminal 176. Terminal 176 is connected to terminal 172 through a tamper switch 178 that is provided between face plate 4 and back plate 8 to automatically open and to remain open should any attempt be made to tamper with the electronic system or other components of the Module contained between these two plates.

In the manner just described, the system detects passage of an intruder through the fields of view of the Module within a predetermined interval, the intruder going from the field viewed by the detector input to channel A then by the detector input of channel B, or vice versa, the resulting signals causing power FETs 162, 163, 164 and 168 to change state and thereby signal such an event.

Of course other events could also cause detectors 66 and 66' to each produce an output. For example, a strong flash of white light occurring on both detectors, or a blast of hot air applied to the Module, could cause both detectors to produce an output. Should this happen, the logic 0 signals occurring on Nor gates 124 and 124' would be applied through capacitors 182 and 182', simultaneously to apply logic 0 signals to the inputs to Nor gate 138, this Nor gate being normally biased to a logic 1 condition through resistors 184 and 184' and line 102. The momentary drop to a logic 0 condition of the inputs to Nor gate 138, triggered by the simultaneous dropping to a logic 0 condition of Nor gates 124 and 124', causes that output of Nor gate 138 to change to a logic 1 condition. This in turn recharges capacitor 130 through diode 142 at an exceedingly rapid rate, causing the latch circuit 124-126 (and its twin in channel B) to promptly return to a quiescent condition. In this fashion the inputs to Nor gate 144, though they may both drop to a logic 0 condition, do so only for a very brief interval, an interval insufficient to cause capacitor 152 to discharge sufficiently to trigger a change of state in the power FETs. Thus, the electronic system rejects extraneous environmental inputs. (It should be noted that the design of the detector array assists significantly in achieving this result.)

Because the detector elements 66 are arranged in a back to back condition and held between the two secondary reflectors, when white light enters one side of the detector array it will enter the detector element on that side either directly or more likely after one or more reflections. The energy not absorbed by that detector element (and only a small amount of the energy will be absorbed in the detector element), will pass immediately through the adjacent detector element then will exit from the detector array either directly or after one or more reflections off the inner face of this secondary reflector and the adjacent detector element. A small amount of the energy will also be absorbed by the second element. The second element will received most, but not all, of the radiant energy striking the first element, since some of that radiant energy will have been absorbed by the first element. For this reason, there may be less energy impinging on the second element than impinges upon the first element (whichever element for the particular ray trace being considered happens to be the first element and the second element). Accordingly, it is possible that a low level environmentally produced light beam, such as a scanning car headlight, might hit the face of the sensor to cause only one channel to trip. The energy of this beam might cause the second detector to produce an output below the bias or trigger level of its operational amplifier, even though the energy of the beam striking the first detector might have been sufficient to trigger its connected operational amplifier. For this reason, conceivably a low level environmental input could cause the system to produce a false alarm as the headlight scanned across the room at a low light level. To avoid this problem, resistors 184 and 184' are connected through line 102 to the detector elements in such a fashion that, when one channel trips, the resulting input applied through capacitor 182 or 182', its associated resistor, and line 102, aids the signal produced by the other detector element sufficiently to result in a signal level applied to its operational amplifier adequate to simultaneously trip it, thereby preventing a false alarm. In this fashion, the sensitivities of the two channels are dynamically and momentarily adjusted, the activation of one channel virtually instantaneously increasing the sensitivity of the other channel to insure that false alarms will be avoided. Thus, the system is quite immune to false alarms arising from scanning car headlights or hot air blasts on the face of the sensor or cold drafts, or line transients, or extraneous electromagnetic signals. Of course, it is possible that a repetitive event of this sort, or a rapid series of events of this sort, could occur. Diode 142 is connected from the output of Nor gate 138 to one side of capacitor 130 to maintain its charge in the event that Nor gate 138 produces a logic 1 output, or a series of such outputs.

A very strong beam of radiation may strike the Module, either accidentially or intentionally. To assist in preventing such an occurrence from blinding the system even momentarily, an appropriate filter may be included in the optical system, or an automatic gain control feedback may be provided to bias the element in a manner to increase its dynamic range appropriately and offset the effects of such a high energy beam. Of course, depending upon the preferences of the circuit and system designer neither or both of these provisions may be incorporated in the Module.

The Module may be installed to cause one of the detector elements to view a stationary environmental source of infrared energy, such as an electric heater, or a hot air duct. When this source cycles to change its emitted infrared radiation, even though the resulting channel of the system will be activated, thereby discharging capacitor 130, the channel will remain in an activated state only for as long as required to recharge capacitor 130 through resistor 132, this period probably being on the order of 8 seconds or so. Accordingly, the system will not be tripped to an alarm condition when such a change occurs in its field of view.

It is important to periodically check the operation of the system to insure that all components are functioning properly. In view of the components employed in the preferred system and their exceedingly long lifetimes, it is really not necessary to check the operation of the system certainly more than once or twice a week; for example, the lifetime of the battery employed in the preferred system—a Panasonic lithium battery, Model BR-2325—is expected to be on the order of ten to twenty years. Because of the design of the preferred system, only one of the channels need be operative to initiate a test sequence. An event could have occurred that renders one of the channels non-operative (an exceedingly unusual situation) yet the test circuit included in the preferred system would still function sufficiently to signal this condition.

Another important feature of the test circuit, in the design of the preferred system, is that it operates only when the system is triggered by an intruder related input. Thus, since such input will occur very likely throughout the day, if the system is not functioning properly, upon being armed at the end of the day to monitor an area through night time or non-business hours, the system will indicate immediately to the user that it is not functioning properly. Also, should for example the system malfunction during night time or non-business hours while the system is armed, this malfunctioning only will be signaled to the operator after the system has signaled the presence of an intruder, the test circuit preventing rearming of the system after that signalling.

The test circuit employs Nor gates 202 and 204. When normal daytime traffic has activated either of the channels of the system, or when an intruder has triggered the alarm condition, either or both of the latch circuits will apply a positive voltage charge to capacitor 206 through the diodes 207 and 207' connected to the outputs of the latch circuit and resistor 208. This rapidly charges the capacitor 206. It in turn charges capacitor 210 slowly through resistor 212. Some significant period after capacitor 206 has been charged (e.g., 20 to 30 seconds later) the charge on capacitor 210 will be sufficient to cause the input of Nor gate 204 to go to a logic 1 condition, causing the output of that Nor gate to go to a logic 0 condition. This condition is applied to one input of Nor gate 202 and to one side of a capacitor 214, the other side of this capacitor being connected to the other input of Nor gate 202. Accordingly, the output of Nor gate 202 will switch to a logic 1 condition, causing capacitor 210 to aid the signal applied to the input of Nor gate 204 producing or reinforcing a rapid triggering of that Nor gate, and holding it in a condition in which the output of Nor gate 204 is a logic 0 signal. This logic 0 signal is applied through a voltage divider network consisting of resistors 216 and 218 to thereby reduce the voltage applied to the common terminal of the detector elements 66 and 66' and provide a simultaneous input to the two channels and gate 138. If all is operating properly, because if the simultaneous inputs to gate 138 no alarm signal will result. However, if either channel, or the circuitry associated with gate 138 is not operating properly, an alarm signal will result. In this fashion the test circuit actually tests the sensitivity of the module's detectors and preferred circuitry.

When Nor gate 204 produces a logic 0 output, causing both channels to trip simultaneously, as it should, then the output of Nor gate 144 should switch to a logic 1 condition, and Nor gate 146 to a logic 0 condition, for a brief period. This output in turn is applied for a moment through diode 224 to the input or Nor gate 204, rapidly discharging capacitor 210 and causing the output of Nor gate 204 to change to a logic 1 condition, thereby releasing the junction of resistors 154 and 156 from a logic 0 condition as determined by diode 222. The timing of these events is sufficiently rapid, relative to discharge of capacitor 152 through resistor 156, that the power FETs will remain in their untriggered condition if all components operate properly.

In the typical installation, the Module will view an area through which people pass during normal, daytime hours. If the electronic system included within the Module is not operating properly, such daytome traffic will cause the channel's to trip and charge capacitor 206 to initiate the test sequence just described. Should the system's battery be weak, or should some malfunction have occurred in the system, because discrete components are employed in both channels, there will be a slight difference between the operation of each channel inherently causing one channel to fail to operate before the other. Therefore, Nor gate 138 would not inhibit an alarm signal and Nor gate 146 would fail to reset the test circuit sufficiently rapidly, thus allowing capacitor 152 to discharge through resistor 156 an amount sufficient to trigger the power FETs 162, 163, 164 and 168. The resulting output from Nor gate 166 now applies through resistor 230 a positive voltage to one of the inputs of Nor gate 202. This in turn causes the output of Nor gate 202 to switch to a Logic 0 condition, causing Capacitor 210 to pull the input of Nor gate 204 to a Logic 0 condition, in turn causing the output of this Nor gate to go to a Logic 1 condition and reset the test circuit. In this fashion, the test circuit is rearmed and will recycle if the malfunction continues to exit. This in turn will result in the output of the Nor gate 126 or 126' being held in a Logic 1 condition long enough to recharge Capacitor 206 sufficiently to reapply a Logic 1 condition to the input of Nor gate 204. As a result, the output of Nor gate 204 will return to a Logic 0 condition, thereby retriggering the test condition and, should the malfunction continue to exist, to reactivate an alarm condition once every 30 seconds or more (a delay period required by present governmental regulations concerning radio broadcasting). This repeating but intermittent output is necessary, particularly if short range radio transmitters are being employed in the alarm system. It distinguishes a malfunction from an alarm signal as well. Such a test sequence, this retriggering normally initiated during daytime hours, repeats and prevents the system from being properly armed at nigh. Also since the person arming the system at night normally passes through then monitored area after arming the system, sch a repeating alarm will then be initiated if the system is not properly functional. However, during nighttime hours or at other times when the system is around and monitoring an area, only the presence of an intruder will trigger a test cycle. Thus, the alarm circuit prevents needless false alarms by only enabling this action of the sensor's electronics when a malfunction in fact has occurred, and by only initiating a test sequence when someone passes through the Module's field of view, and not when simultaneous inputs to both channels occur.

Figure 8:
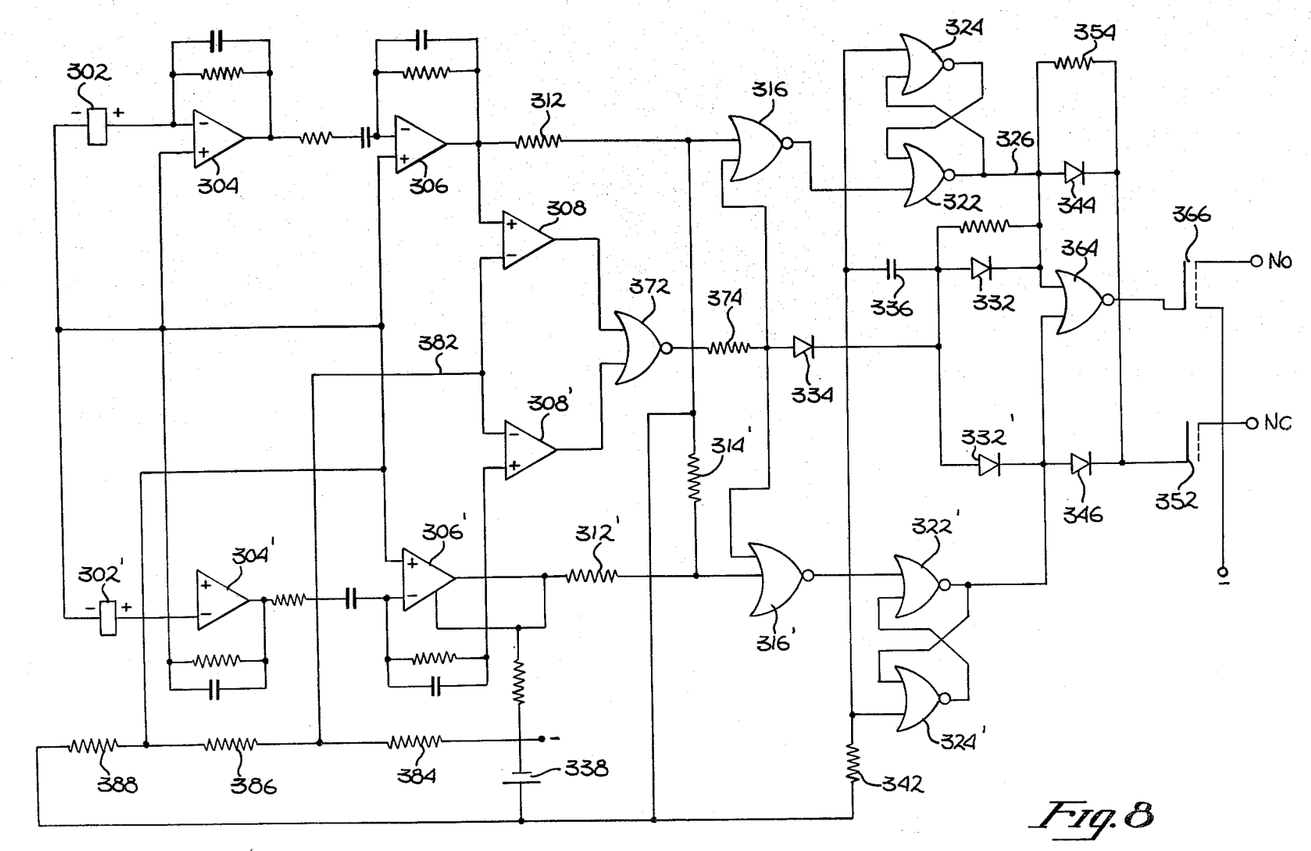
FIG. 8 is a schematic diagram of another preferred electronic system for the Module.

Another, and significantly simplified, electronic system that may be employed in the module is shown in FIG. 8. In many respects it is similar to the circuit shown in FIG. 7; in some quite significant ways it is substantially different. In general, this circuit also includes two channels, each connected to the output of one of the pyroelectric elements, each channel being used to trigger a latch circuit. As in the circuit shown in FIG. 7, the combined outputs of the two latch circuits are employed to trigger an alarm condition. To prevent false alarms, the simultaneous output of both pyroelectric elements through the respective channels is used to inhibit actuation of an alarm condition. However, as can readily be seen by comparing the circuit of FIG. 8 with that set forth in FIG. 7, considerably fewer elements are employed to achieve these various functions.

The output of pyroelectric element 302 is applied to operational amplifier 304 and then to operational amplifier 306, this amplifier chain being similar to that shown in FIG. 7. The output of amplifier 306 is in turn applied to amplifier 308, connected to function as a comparator. This output is also applied through a resistor network 312 and 314, the junction of which is connected to one of the inputs of Nor gate 316. Assuming the output of amplifier 306 is sufficient, when divided by resistor network 312 and 314, to trigger Nor gate 316, its output changes from a logic 0 to a logic one condition. This output is applied to the latch circuit consisting of Nor gates 322 and 324, causing their output on line 326 to change from a logic one to a logic 0 condition. This changed condition is applied through diodes 332 and 334 to hold the other input of Nor gate 316 at a logic zero condition for an interval determined as will be described subsequently.

When the intruder passes through the field of view of the other channel, pyroelectric element 302' will cause its connnected amplifier chain 304' and 306' to produce an output. This output is applied through resistor network 312' and 314' to cause Nor gate 316' to change its output state from a logic 0 to a logic 1 condition. This in turn trips latch circuit 322' and 324; the conduction of which through diodes 332' holds it in tripped condition for an interval determined as follows. Condition of either diode 332 or 332' discharges capacitor 336 which then is recharged by battery 338 through resistor 342. Preferably the values of resistor 342 and capacitor 336 are related to the battery voltage to apply a sufficient charge, after an interval on the order 5 seconds or so, to trigger Nor gates 324 and 324' to reset the latch circuits into their normal, quiescent state.

The latch circuits in their quiescent state apply a positive voltage through diodes 344 and 346 to MOS FET 352 sufficient to maintain it in a conductive, or normally closed, condition. When one of the latch circuits trips, its output changes to a logic 0 condition. This tends to discharge the potential on the MOS FET 352 through resistor 354. However, if only one channel has been tripped, this discharge rate is counter balanced by charge being applied through the other channel's diode and is not sufficient to cause FET 352 to cease conductance. Thus, if the sequence of events required to actuate the system do not occur within the interval predetermined by the charging of capacitor 336, the tripped latch circuit will be reset and the system will restabilize in its quiescent condition. However, if the second latch circuit also trips within this period, non-conductance of its diode (either 344 or 346), will cause FET 352 to open and produce an output indicative of the presence of an intruder.

In a similar fashion, the latch circuit gates maintain a logic 1 charge on Nor gate 364 unless an intruder has been detected, the resulting inputs causing Nor gate 364 to be actuated and its output to go to a logic 1 condition. This output in turn is applied to MOS FET 366 causing its output to change from an normally open to a normally closed state, thereby to indicate the presence of an intruder.

An important feature of the system is its ability to discriminate between intruder related inputs and non-intruder related inputs. Non-intruder related inputs are simultaneous, or virtually simultaneous, inputs. Thus, both amplifier chains 304–306, and 304'–306', will produce outputs at the same instant or very close to the same instant. The output of amplifier 306 is applied to amplifier 308, as has been noted. If the output exceeds a bias value applied to the other input of amplifier 308, amplifier 308 will produce an output; it is applied to Nor gate 372. The output of Nor gate 372 is applied through resistor 374 to both Norgate 316 and 316', as well as to diode 334. If, however, substantially simultaneous inputs have been produced by pyroelectric elements 302 and 302', comparators 308 and 308' will both apply inputs to Nor gate 372 prior to the charge on the junction between resistors 312 and 314 changing sufficiently to trigger the connected Nor gate 316 (or 316'). Thus, since the outputs of both amplifiers 308 and 308' will be simultaneously applied to Nor gate 372 for a brief period, during this period Nor gate 372 will remain in a logic 1 condition, to prevent any change in the output state of the system, thereby inhibiting an alarm condition.

A small bias voltage is applied to the negative terminals of Nor gates 308 and 308' over line 382, this bias voltage being developed across resistor 384. Resistor 384 is a part of a resistive voltage divider network including resistor 386 and 388, this network being connected across battery 338. Thus, amplifiers 308 and 308' can be made to be very sensitive to even a small simultaneous inputs from the pyroelectric elements (normally they might be biased by about 0.25V) above 306 and 306'.

The circuit shown in FIG. 8 does not include the capability of periodically testing the battery voltage. However, since the elements will drain the battery at a very low rate, it is anticipated that the battery life will be exceedingly long. Simple preventive maintenance procedures including replacement of the battery every few years should be sufficient to guard against any failure of the circuit due to insufficient battery voltage. However, if desired of course a battery test circuit such as described in connection with FIG. 7 could be incorporated in the circuit of FIG. 8.

The circuits herein disclosed also provide a simple pyroelectric element for each channel. Alternatively, a dual, differential pyroelectric element may be employed, if desired, as described in my U.S. Pat. No. 3,839,640. Such a configuration is particularly desireable when the Module is located in an environment in which it may be subjected to extraneous environmental inputs of high intensity (e.g., an outdoor location subjected to direct or reflected sunlight, or a location viewing turbulent hot air) since such inputs otherwise would swamp a single element and effectively blind the Module, at least temporarily.

Figure 9:
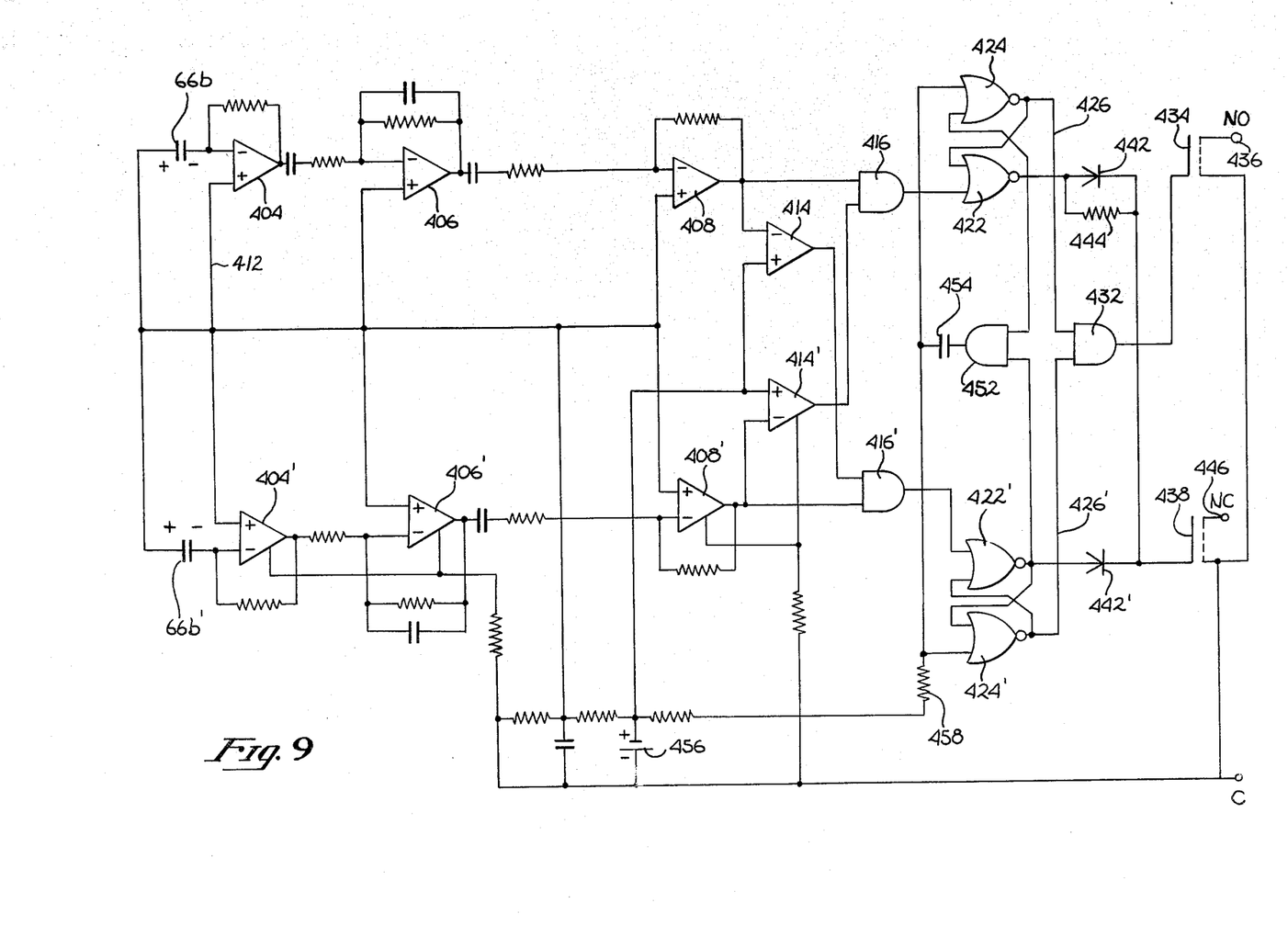
FIG. 9 is a schematic diagram of still another preferred electronic system for the Module.

A further and alternate embodiment of the electronic system which may be employed in the module is shown in FIG. 9. In many respects it too is similar to the circuits shown in FIGS. 7 and 8; it is substantially different in some other respects, though. In general, the circuit illustrated in FIG. 9 also employs two channels each connected to the output of one of the pyroelectric elements shown, for example in FIG. 5. Each channel is used to trigger a latch circuit, combined outputs of the latch circuits being in turn employed to trigger an alarm condition. To prevent false alarms this circuit also senses a substantially simultaneous output of both pyroelectric elements, and when this condition occurs inhibits actuation of the alarm condition. While the circuit shown in FIG. 9 is similar in the foregoing respects to the circuits shown in FIGS. 7 and 8 it does incorporate important differences, some of which will be obvious to those skilled in the art, others of which will be discussed in the following paragraphs.

To briefly review the operation of the circuit illustrated in FIG. 9, the output of the pyroelectric elements 66b and 66b' are applied to their associated chains of operational amplifiers 404, 406 and 408 or 404', 406' and 408'. Assuming that the input to operational amplifier 404 (or 404') is above some predetermined bias level on line 412, operational amplifier 408 (or 408') will produce an output. This output is applied to comparator 414 (or 414') and to an AND gate 416 (or 416'). The output of AND gate 416 (and 416') is applied to a latch circuit consisting of Nor gates 422 and 424 (or 422' and 424'). This causes the output of Nor gate 424, normally at a logic 0 voltage, to rise to a positive or logic 1 voltage. This output is applied over line 426 to AND gate 432.

Assuming that an intruder were being sensed by the system, the circuitry of the second channel would respond in a similar fashion to that just described, actuating latch circuit 422'–424' and causing a positive output to appear on line 426'. These combined positive outputs result in a positive output of AND gate 432, which is applied to cause a MOSS FET 434 to conduct, thereby closing the normally open condition existing on terminal 436. In a similar fashion the combined outputs of Nor gates 422 and 422', normally at a positive or logic 1 voltage when untripped, drop to a logic 0 voltage permitting the potential previously applied to MOSS FET 438 by the latch circuits through diodes 442 and 442', respectively, to discharge through resistor 444 thereby electrically opening the normally closed condition existing on terminal 446.

If simultaneous inputs were applied to pyroelectric elements 66b and 66b', such as might occur as a result of a flash of sunlight or car headlights in the area being viewed by the elements, whichever channel first reaches the comparative trip level will cause its associated comparator 414 or 414' to produce an output to inhibit of the other AND gate, namely 416' or 416. Thus, virtually simultaneous inputs to both channels will prevent triggering of the latch circuits by virtue of one channel, inhibiting the output of the other channel to prevent the occurence of an alarm condition.

Tripping of the latch circuit causes the output of either Nor gate 422 or Nor gate 422' (or both) to drop to a logic 0 level, thereby causing the output of AND gate 452 to drop to a logic 0 condition and pull capacitor 454 to logic 0. This capacitor is charged from battery 456 through resistor 458, the time constant of resistor 458 and capacitor 454 being such that the alarm output of the circuit exists for a few second period sufficient to signal to associated circuitry, or to the user, the presence of an intruder. The other unmarked elements of the circuit are employed to establish appropriate bias voltages.

Assume that an intruder passes through the fields of view of the pyroelectric elements 66b and 66b' in close proximity to the sensor. Thus, the intruder would still be in one field of view when the other field of view is entered, and its associated channel produces an output. This well could cause one channel's output to saturate and to remain in a saturated condition when the intruder enters the other field of view. As a result, comparators 414 and 414' would inhibit outputs of AND gates 416 and 416'. Such inhibition would cease, however as the intruder left the respective fields of view. When the intruder entered the first field of view, its associated latch circuit would be actuated. When the intruder left the first field of view the other AND gate would not be inhibited and the other latch circuit would be actuated. Thus, as the intruder entered and left the fields of view, the respective latch circuits would be actuated to trigger an alarm condition. In this fashion, the effective width of the near field of view is artificially widened by the electronic circuit to insure that the presence of an intruder in close proximity to the module is detected.

As has been noted, and as will be obvious to those skilled in this art, an important feature of the Module described in this application is its use of a pair of transparent sensors configured to direct radiation through both sensors. Thus, visible radiation that passes through one sensor (with minimal light attenuation) will pass directly through the other sensor to result in substantially equal and simultaneous inputs being applied by the two pyroelectic elements and to their associated channels. Thus, this design inherently rejects such simultaneous inputs or radiation, and further assures that the system will not signal an alarm condition as a result of such simultaneous inputs.

In certain circuits, particularly those of a design and operatin such as shown in FIG. 9, it may be desirable to delay somewhat the response of the AND gates 416 and 416' relative to amplifiers 408 and 408'. If so, delay circuit may be employed to connect the amplifiers 408 and 408' to their associated AND gates. This will slow down the response of each channel somewhat, and allow the other channel additional time to operate and inhibit the response of AND gates 416 or 416'.

While the basic operation of preferred sensor electronic circuits have been described, the action of certain components of the preferred system has not been set forth, and the operation of certain other components has only been briefly mentioned, all because the functioning of the system will be apparent to one skilled in this art basically from an examination of the schematic set forth in FIGS. 7 and 8. For that reason, probably no description of the preferred system really is necessary to enable those skilled in this field to make full use of the preferred system and its novel features. For the same reason, the various semiconductive components have not been identified further, and the values of the various elements have not been specified.

As has been noted, variations in the preferred Intruder Detection Module and the systems it includes may be made while still employing the teachings herein set forth to achieve the advantages described. Accordingly, the scope of the invention is not limited to the preferred embodiments which have been described, but rather is set forth in the following claims.

I claim:

1. An intruder detection module having:
   sensor means for producing an electric signal in response to non-visible radiation emitted by an intruder, the sensor means including at least one sensor pair having sensors substantially opaque to said non-visible radiation but substantially transparent to visible radiation;
   optical means including a primary reflector for directing visible and non-visible radiation from a plurality of zones, both the visible and non-visible radiation from one zone being directed onto one sensor of the sensor pair, the visible and non-visible radiation from the second zone being directed onto the second sensor of the sensor pair;
   means to direct radiation passing through one sensor to the other sensor of the pair, and
   electronic means responsive to the electric signal output of the sensors to produce an alarm signal if one then the other sensor produces an output but to inhibit the alarm signal if both sensors produce an output at substantially the same time, whereby the system discriminates between radiation flashes simultaneously striking both sensors and movement of a non-visible radiation source across the zones defined by the optical means.

2. An intruder detection module as set forth in claim 1 in which the optical means includes a plurality of reflectors, and facet reflectors to direct radiation from other zones onto the primary reflector and hence to the sensor pair.

3. An intruder detection module as set forth in claim 2 in which the facet reflectors are removably mounted in the optical means.

4. An intruder detection module as set forth in claim 1 in which the means to direct radiation passing through one sensor to the other sensor of the pair mounts the sensors of the pair in an adjacent, facing relationship to permit radiation passing through one sensor to immediately strike the other sensor.

5. An intruder detection module as set forth in claim 4 in which the sensor pairs are mounted in frames received between two secondary reflectors, the secondary reflectors directing both visible and non-visible radiation onto the sensors.

6. An intruder detection module as set forth in claim 5 in which the sensor pair and associated frames and secondary reflectors are attached as a unit to a printed circuit board bearing the electronic means.

7. An intruder detection module having sensor means producing an electrical signal and responsive to an intruder, the sensor means including at least a pair of sensor elements viewing adjacent fields and responsive to the passage of an intruder between those fields to cause one sensor then the other sensor of the pair to product an electrical signal;

electrical means connected to the sensor means and responsive to the electrical signals produced by the pair of sensor elements to generate an alarm signal, the electronic means having two channel means, each channel means being connected to a corresponding one of the sensor elements and responsive to the electrical signals of that element to produce a first output signal;
  alarm actuation means electrically responsive to the first output signals of the two channel means to generate an alarm signal;
  inhibition means responsive to the substantially simultaneous generation of first output signals to inhibit the generation of an alarm signal;
  timing means to delay the generation of an alarm signal sufficiently to permit the inhibition means to respond to the substantially simultaneous generation of first output signals by the channel means, thereby to prevent the generation of an alarm signal upon the occurrence of such a substantially simultaneous response of the two channel means; and
  signal means responsive to the first output signals to produce a signal effectively increasing the sensivity of at least one channel means, whereby the sensivity of the electronic means to low level inputs to the sensor is increased to ensure that such low level signals will be detected.

8. An intruder detection module as set forth in claim 7 in which the signal means simultaneously effectively increases the sensivity of all channel means.

9. An intruder detection module as set forth in claim 7 in which the timing means and the inhibition means together define the sequence of first output signals required to permit the alarm actuation means to generate an alarm signal, the sequence being greater than a first interval required by the timing means but less than a second interval required by said inhibition means.

10. An intruder detection module as set forth in claim 7 including test circuit means responsive to at least one of said first output signals to cause the alarm actuation means to generate an alarm signal if either of the channel means or the inhibition means is not operating properly.

11. An intruder detection module as set forth in claim 10 in which the test circuit means produces an output signal which is applied to cause both sensor elements to simultaneously generate electrical signals, and control means responsive to the output of the inhibition means to prevent the alarm actuation means from generating an alarm signal, whereby if both the channel means and the inhibition means are operating properly, generation of the alarm signal as a result of the test circuit output signal is prevented.

12. An intruder detection module as set forth in claim 11 including time delay means to delay operation of the test circuit means until after of the expiration of predetermined interval sufficient to permit the alarm actuation means to generate an alarm signal if the module is functioning properly.

13. An intruder detection module as set forth in claim 12 including timing means to delay generation of the alarm signal sufficiently to permit the inhibition means to respond to the simultaneous generation of first output signals, thereby to prevent generation of an alarm condition upon the occurrence of such a simultaneous generation of output signals.

14. An intruder detection module as set forth in claim 13 in which the inhibition means is responsive to the substantially simultaneous generation of first output signals to inhibit generation of the alarm signal if the sequence of first output signals is less than a first interval.

15. An intruder detection module as set forth in claim 14 including signal means responsive to the first output signals to produce a signal simultaneously increasing the sensivity of the channel means, whereby the sensitivity of the electronic means to low level simultaneous inputs to the sensors is increased to ensure that such low level signals will be detected.

16. An intruder detection module as set forth in claim 15 in which the sensor means responds to non-visible radiation emitted by an intruder, the sensor elements being substantially opaque to said non-visible radiation but substantially transparent to visible radiation, the intruder detection module further including;

optical means including a primary reflector for directing visible and non-visible radiation from a plurality of zones, the visible and non-visible radiation from one zone being directed onto one sensor element, the visible and non-visible radiation from the second zone being directed on to a second sensor element; and
  means to direct radiation passing through one sensor to a second sensor element.

17. An intruder detection module as set forth in claim 16 in which the optical means includes a plurality of reflectors, and facet reflectors to direct radiation from other zones onto the primary reflector hence to the sensor elements, the facet reflectors being removably mounted in the optical means.

18. An intruder detection Module as set forth in claim 7 in which inhibition means are included in each channel means, each inhibition means preventing response of the alarm actuation means to the other channel means for a period determined by the inhibition means.

19. An intruder detection Module as set forth in claim 18 in which each inhibition means compares a signal produced by its associated channel means with a reference signal and only prevents response of the alarm actuation means if the channel signal exceeds the reference signal.

20. A detector for an intruder detection system as set forth in claim 18, including optical filter means between the sensor elements to inhibit passage of long wavelength infrared radiation from one element to the other.

21. A detector for an intruder detection system having optical means defining at least two discrete fields of view and directing visible and infrared radiation from these fields of view to adjacent locations, and having electronic means responsive to signals to produce an alarm output, the detector including:

at least a pair of discrete sensor elements responsive to at least infrared radiation to produce an electrical signal;

means mounting the sensor elements in an adjacent, facing relationship; and at least one reflector at said adjacent locations to direct radiation from the fields of view onto the outer face of the sensor elements, one field being directed onto the outer face of one element while the other field is directed onto the outer face of the other element, whereby white light and short wavelength infrared radiation passing through one sensor may pass directly through the adjacent sensor.

* * * * *